(12) United States Patent
Zimmermann et al.

(10) Patent No.: US 11,481,504 B2
(45) Date of Patent: Oct. 25, 2022

(54) CLOUD-BASED COMMUNICATION SYSTEM

(71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE Systems, Inc., Fremont, CA (US)

( * ) Notice: Subject to any disclaimer, the term of this patent is extended or adjusted under 35 U.S.C. 154(b) by 121 days.

(21) Appl. No.: 16/891,012

(22) Filed: Jun. 2, 2020

(65) Prior Publication Data

US 2020/0387617 A1 Dec. 10, 2020

Related U.S. Application Data

(60) Provisional application No. 62/856,756, filed on Jun. 4, 2019.

(51) Int. Cl.
*G06F 21/60* (2013.01)
*G06F 21/45* (2013.01)

(52) U.S. Cl.
CPC ............ *G06F 21/602* (2013.01); *G06F 21/45* (2013.01)

(58) Field of Classification Search
CPC ........ G06F 21/602; G06F 21/45; G06F 21/64; G06F 21/6209
See application file for complete search history.

(56) References Cited

U.S. PATENT DOCUMENTS

| 2018/0181756 A1* | 6/2018 | Campagna ............ H04L 9/0877 |
| 2018/0238570 A1* | 8/2018 | McCarthy ................. E04H 9/12 |
| 2019/0311117 A1* | 10/2019 | Sysman ................... G06F 11/00 |
| 2021/0240857 A1* | 8/2021 | Bandi .................... H04L 9/3236 |
| 2021/0271437 A1* | 9/2021 | Haapanen ............. G06F 3/1297 |

* cited by examiner

*Primary Examiner* — Abiy Getachew
(74) *Attorney, Agent, or Firm* — Horizon IP Pte. Ltd.

(57) ABSTRACT

A cloud-based communication framework. A client device may generate a file for an information technology (IT) device. The client device may request a password for the file. The password may be used to encrypt the file. A signature may be determined based on the encrypted file and the password. The signature and encrypted file may then be stored on a cloud-computing platform for downloading by the IT device, wherein the first signature is used by the IT device to validate authenticity of the encrypted file.

20 Claims, 5 Drawing Sheets

United States Patent
US 11,481,504 B2

CLOUD-BASED COMMUNICATION SYSTEM

CROSS-REFERENCE TO RELATED APPLICATION

This application claims the benefit of U.S. Provisional Application No. 62/856,756, filed Jun. 4, 2019, which is hereby incorporated by reference in its entirety.

BACKGROUND

As an organization expands, there is an increasing need to purchase, deploy, and/or maintain devices (e.g., routers, serial consoles, data center devices, networking devices) at each head office and at each branch office of the organization. These devices are typically pre-configured prior to deployment. However, if any device is lost, stolen or otherwise intercepted during shipment, sensitive configuration data is at risk of being accessed by unauthorized third-parties. In addition, with an expanding network of devices, it becomes increasingly difficult to monitor and manage the devices remotely. As a result, scalability is limited, and downtime can be significant.

DETAILED DESCRIPTION

Figure 1:
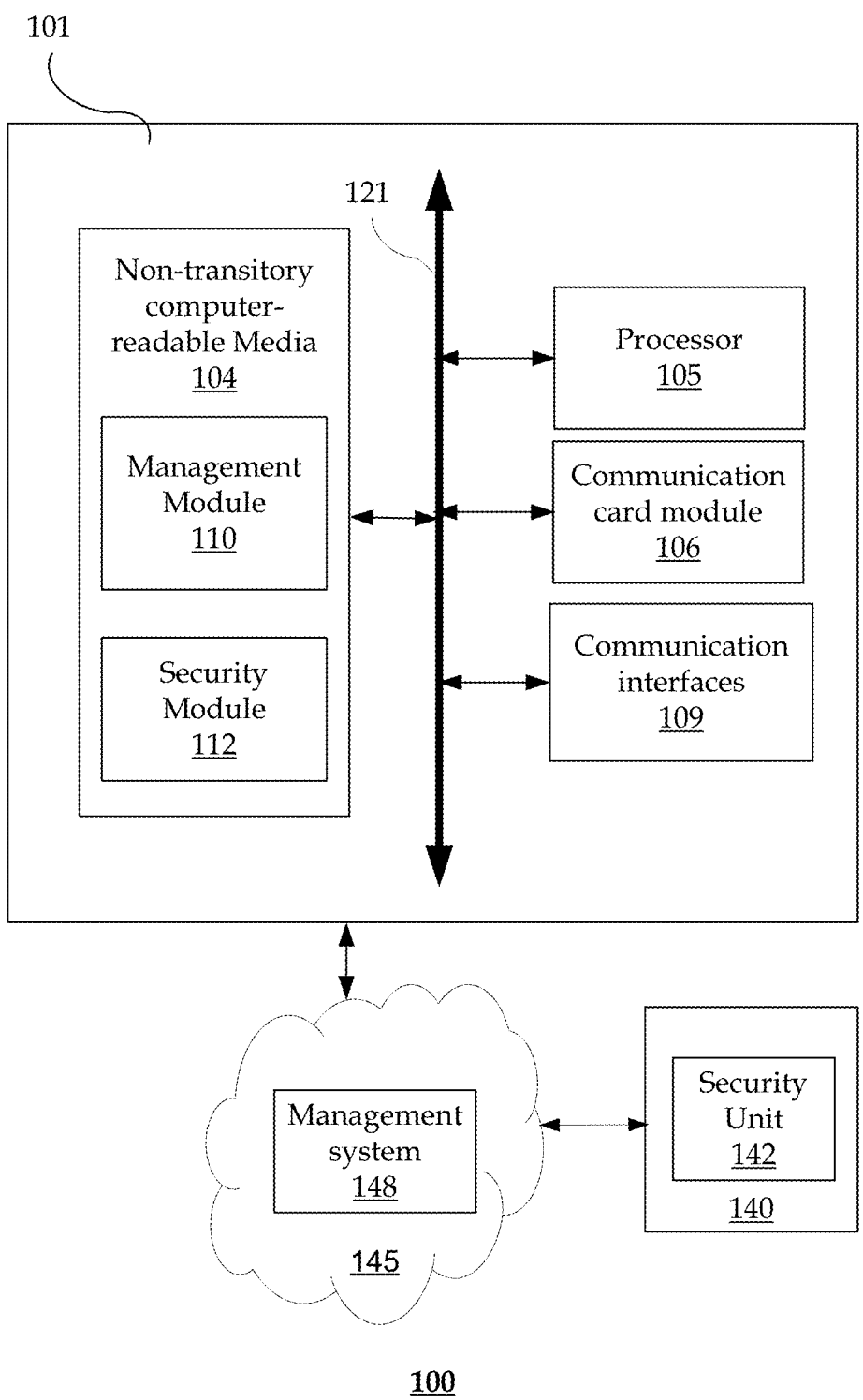
FIG. 1 illustrates an exemplary system.

Some of the various embodiments of the present invention relate to infrastructure management systems, and more particularly to a data center infrastructure management device (s) configured to process network communication of data center component(s). Various embodiments relate to a data center infrastructure configured to process network communication from data center component(s) (e.g. IT devices) and employ the device information to determine an action to be performed on data center component(s) in an infrastructure management system.

A device is a machine and/or component that may attach to a computer and/or computer network. Examples of devices include disk drives, printers, displays, mice, and modems. These particular devices may fall into a category of peripheral devices separate from a main computing device. Other example devices may be non-peripheral devices such as IT devices. Many devices, whether peripheral or not, may employ a program called a device driver that may act as a translator, converting general commands from an application into specific commands that the device understands.

An IT device is an "Information Technology" device related to computing technology, comprising, but not limited to: data center devices, networking devices, hardware devices, software operating in combination with a hardware IT device, Internet devices, and/or the like. Some IT devices may employ virtual devices operating on specially configured hardware. Additional examples of IT devices include infrastructure management devices, servers, compute nodes, routers, switches, firewalls, load balancers, networking nodes, storage nodes, power nodes, cooling nodes, storage appliances, power appliances, cooling appliances, network appliances, virtual devices, virtual machines, system hardware with network access, hosted module within a system, combinations thereof, and/or the like.

A virtual device may employ a software virtual device driver operating on a hardware computing device configured to emulate hardware and/or other devices so that multiple applications may, for example, access hardware interrupt channels, hardware resources and memory without causing conflicts. Computer hardware may require communication and control processes for devices and/or hardware components to access each other in a controlled manner. These processes may be defined as device drivers, which may comprise code that an application may employ to access hardware and/or external software resources. Some example virtual devices may be configured for use in multitasking operating systems. In such an example, a device driver may be controlled by an operating system's virtual device driver manager and shared by applications running within that kernel. A virtual device driver may pass interrupt and memory requests through the kernel, which in turn may allocate resources as required.

Some of the various embodiments may communicate with virtual (in combination with configured hardware) and/or physical IT devices such as compute nodes, networking nodes, storage nodes, power nodes, cooling nodes, other IT devices, combinations thereof, and/or the like. An infrastructure management system may automatically perform an action on IT device(s)—based at least in part, by an IT device information.

The nature of the interaction between infrastructure management system(s) and IT device(s) may be regulated by the type of device itself to dictate network protocols natively supported by the IT device(s). The type of IT device(s) may also be used to identify a class or type of action that may apply for IT device(s) available in a network.

The present framework provides a cloud-based communication system. The cloud-based communication system may be used to manage, monitor, enroll, initialize and/or configure various Information Technology (IT) devices (collectively "IT devices") distributed across a distributed infrastructure network. The present framework facilitates zero-touch provisioning of IT devices, which may be shipped to the desired physical location (e.g., client's branch office) without pre-configuration. Advantageously, if any IT device is lost on the way to the location, there is no security risk of unauthorized third-party access of sensitive data stored on or with the device.

In accordance with one aspect, the present framework provides a mutual-side authentication for secure enrollment and/or initialization of IT devices using the cloud-computing platform. Connection from the IT device to cloud-computing platform works with public or private internet protocol (IP), since it is initiated by the device. Connection to the cloud-computing platform is resilient, since the device can connect over multiple links, such as local area network (LAN), wide area network (WAN) and failover to cellular network.

In accordance with another aspect, the present framework provides a cloud-computing platform that combines encryption, file signature verification and a secure process to store configuration and other device files. More particularly, the framework enforces security for remote processing of a file on an IT device, by safely storing the device file and authenticating it on one or multiple devices in a model that does not require storing any sensitive information outside of the IT device. The framework further extends the ability to validate file authenticity by ensuring that the file received on the IT device is the same as the one uploaded to the cloud-computing platform. Additionally, since this framework does not require any sensitive information to be stored on the cloud-computing platform, it ensures that unauthorized files cannot be sent to the IT device because the file authentication process will fail. The sensitive information that is securely stored only on the device, which can be safely retrieved after a decryption or an authenticated signature verification is completed. These and other exemplary features and advantages will be described in more details herein.

FIG. 1 illustrates an exemplary system 100. The system 100 includes an Information Technology (IT) device 101 communicatively coupled to a client device 140 via a cloud-computing platform 145. In some implementations, IT device 101 includes one or more non-transitory tangible machine-readable media 104 coupled to one or more processors 105, communication card modules 106 and one or more communication interfaces 109 via an input-output interface 121. Other components may also be included. For example, support circuits such as a network switch, cache, a power supply, and a communications bus may also be included.

IT device 101 may be communicatively coupled to one or more other IT devices via one or more communication interfaces 109. IT device 101 may also comprise a multitude of IT devices configured to cooperatively operate together. In some implementations, IT device 101 is communicatively coupled to other IT devices over a network. The network may comprise, but is not limited to: the Internet, an intranet, a connection to the Internet, a private cloud, interconnected data centers, a multi-nodal network, two or more computing devices connected using a Virtual Private Network (VPN), an on-premise network, an RS-232 serial network, an RS-485 serial network, a Local Area Network (LAN), a Wide Area Network (WAN), a Wi-Fi wireless network, an USB port, a Bluetooth™, cellular network, a combination thereof, and/or the like.

One or more communication card modules 106 may be removably inserted or mounted in IT device 101 to provide desired functionalities. The desired functionalities may include, but are not limited to, one or more communication interfaces, network adapter (e.g., Local Area Network or LAN, Wide Area Network or WAN, Virtual Private Network or VPN, Wi-Fi, wireless WAN, Bluetooth™, cellular), storage (e.g., solid-state drive, dynamic random access memory, static random access memory, hard drive), cellular connectivity, satellite navigation, near field communication (NFC), digital radio, Wireless Gigabit Alliance (WiGig), power, compute functions, outlet functions, keyboard-video-mouse (KVM) switch, or a combination thereof. Communication card modules 106 may include the necessary logic for functioning according to a respective standard specification, such as the M.2 (or Next Generation Form Factor), mSATA, Personal Computer Memory Card International Association (PCMCIA), and so forth.

The one or more communication card modules 106 may provide one or more communication interfaces 109. The one or more communication interfaces 109 may include at least one of the following: one or more null-modem serial ports; one or more Data Communications Equipment (DCE) serial ports; one or more Data Terminal Equipment (DTE) serial ports; one or more Cisco pinout serial ports; one or more Cyclades pinout serial ports; one or more straight-through serial ports; one or more cross-over serial ports; one or more RJ45 ports; one or more RS-232 serial ports; one or more RS-485 serial ports; one or more universal serial bus (USB) ports; one or more serial ports; one or more Local Area Network (LAN) ports; one or more Wide Area Network (WAN) ports; one or more Wi-Fi wireless Network ports; one or more input-output (I/O) ports, one or more Ethernet ports (e.g., gigabit Ethernet or GbE ports, copper, Power over Ethernet or PoE+, small form factor pluggable or SFP+, etc.), cellular, a combination of the above and/or the like.

IT device 101 may provide networking processing, data routing and other capabilities. IT device 101 may include at least one of the following: system hardware with network access, a server, a compute node, a router, a switch, a firewall, a load balancer, a networking node, a storage node, a power node, a network appliance, a virtual appliance, a hosted module within a system, a combination thereof, and/or the like. Other IT devices coupled to IT device 101 may include, for example, a server, a compute node, a router, a switch, a firewall, a load balancer, a networking node, a storage node, a power node, a cooling node, a storage appliance, a power appliance, a cooling appliance, a network appliance, a virtual appliance, a virtual machine, system hardware with network access, a hosted module within a system, a combination thereof, and/or the like.

Non-transitory computer-readable media 104 is any available media that can be accessed by IT device 101 and includes both volatile and nonvolatile media, and removable and non-removable media. By way of example, and not limitation, computer-readable media 104 may include computer storage media. Computer storage media includes both volatile and nonvolatile, and removable and non-removable media implemented in any method or technology for storage of information such as computer-readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by IT device 101.

Client device 140 may include a computer system (e.g., workstation, mobile device) and appropriate peripherals, such as a keyboard and display device, and can be operated in conjunction with the entire system 100. For example, client device 140 may include one or more processors coupled to one or more non-transitory computer-readable media (e.g., computer storage or memory device), display device (e.g., monitor) and various input devices (e.g., mouse, touchpad or keyboard). In some implementations, client device 140 includes a security unit 142 stored in the non-transitory computer-readable media for implementing a secure process, as will be described in more details herein.

In some implementations, client device 140 is communicatively coupled to other devices over a network. The network may comprise, but is not limited to: the Internet, an intranet, a connection to the Internet, a private cloud, interconnected data centers, a multi-nodal network, two or more computing devices connected using a Virtual Private Network (VPN), an on-premise network, an RS-232 serial network, an RS-485 serial network, a Local Area Network (LAN), a Wide Area Network (WAN), a Wi-Fi wireless network, an USB port, a Bluetooth™, cellular network, a combination thereof, and/or the like.

Cloud-computing platform 145 generally refers to a group of networked computing resources (e.g., data storage, computing power, network resources, software resources) made available without active management by users. In some implementations, cloud-computing platform 145 represents a family of services hosted on one isolated server, multiple isolated servers, or on distributed servers that virtually appear to users to be a single server. Cloud-computing platform 145 may be isolated or divided onto isolated different servers to facilitate the isolation, organization, and management of diverse families of functions that may be accessed by some authorized parties but not others.

In some implementations, cloud-computing platform 145 includes a management system 148 stored in non-transitory computer-readable media in communication with one or more processors. Management system 148 may provide one or more user interfaces through which users may interact with the cloud-computing system 145. The one or more user interfaces may be accessed via client device 140 to, for example, remotely monitor, deploy, configure, initialize and/or manage IT device 101 and any IT device attached thereto. Client device 140 and/or IT device 101 may connect to cloud-computing platform 145 via the Internet or other communication network, and may request access to one or more of the computing resources managed by cloud-computing platform 145. Client device 140 and/or IT device 101 may include web browser capabilities configured to communicate with the management system 148 via the cloud-computing platform 145 or otherwise through networks, which comprises any public network such as the Internet or World Wide Web or any public or private network as may be developed in the future.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in one or more non-transitory computer-readable media 104. In particular, the present techniques may be implemented by management module 110 and security module 112 stored in one or more non-transitory computer-readable media 104 of IT device 101. The present techniques may also be implemented by management system 148 stored in cloud-computing platform 145 and/or security unit 142 stored in client device 140.

Figure 2:
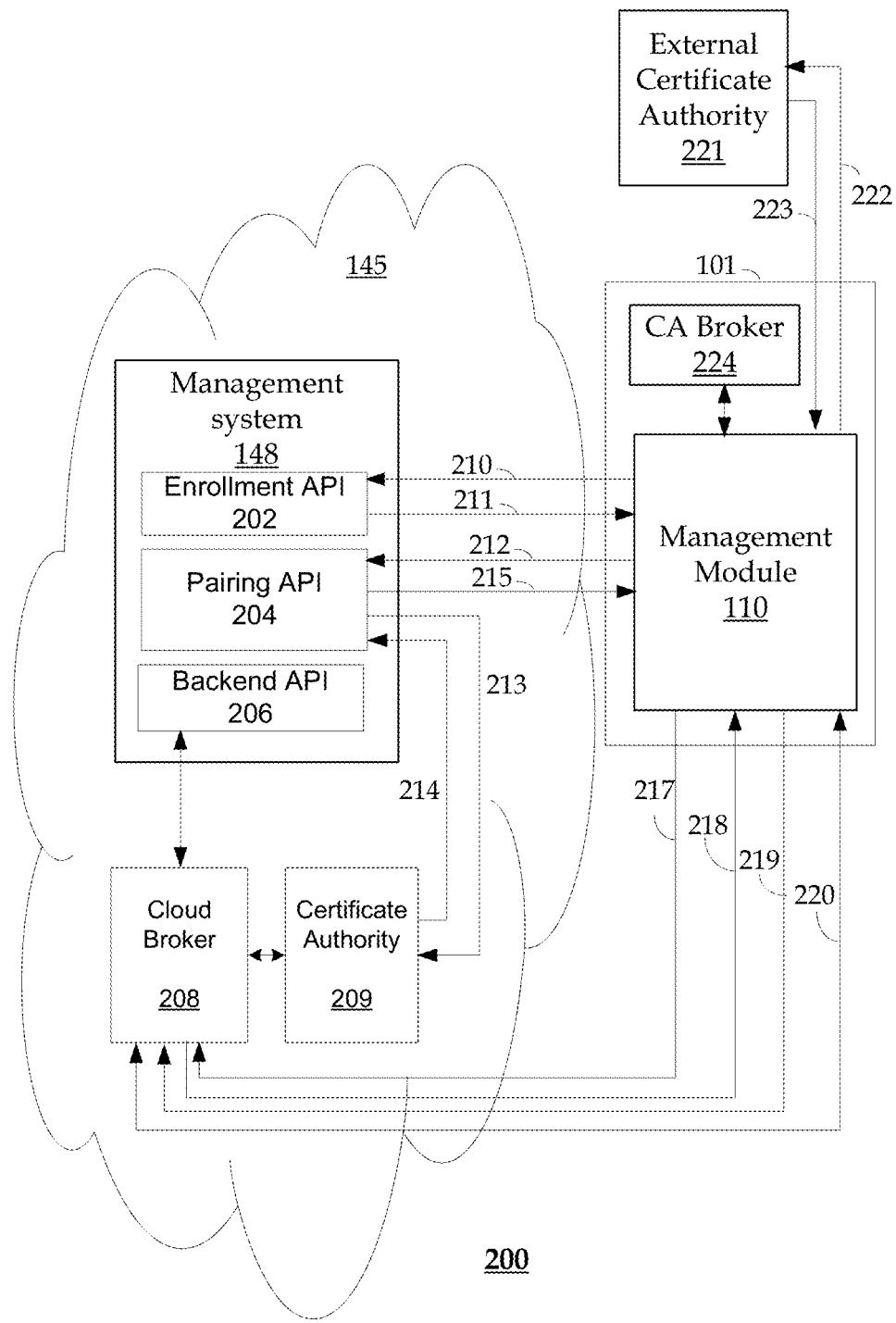
FIG. 2 illustrates an exemplary process for initializing an information technology (IT) device in an exemplary system.

FIG. 2 illustrates an exemplary process for initializing an IT device 101 in an exemplary system 200. To be available for operations, IT device 101 is first enrolled with cloud-computing platform 145. The IT device 101 may be enrolled at the warehouse before it is shipped to the client. Even after enrollment, only standard factory default configuration data may be loaded on the IT device 101. No sensitive configuration data is stored in the IT device 101 to avoid any potential unauthorized access during the transit of the IT device 101 to the client's site. Alternatively, the IT device 101 may be enrolled at the client's site where the IT device 101 physically resides. By allowing the client to enroll the IT device 101 at the client's site, backward compatibility is advantageously supported. For example, if the client has purchased an older version of the IT device 101 and wants to enroll it with cloud-computing platform 145, the client only needs to download the software containing the management module 110 and process it on the IT device 101 to perform the initialization process.

In some implementations, cloud-computing platform 145 includes a management system 148, a cloud broker 208 and a certificate authority 209. Management system 148 may include an enrollment application programming interface (API) 202, a pairing API 204 and a backend API 206. Management system 148 is communicatively coupled to a cloud broker 208, certificate authority 209 and management module 110 of IT device 101. Management module 110 is communicatively coupled to cloud broker 208. Cloud broker 208 is an entity that manages the use, performance and delivery of cloud services provided by cloud-computing platform 145, and negotiates relationships between cloud providers and cloud consumers. Cloud broker 208 may provide a single point of entry to manage multiple cloud services for an organization. Certificate authority (CA) 209 is an entity that issues digital certificates. A digital certificate certifies the ownership of a public key by the named subject of the certificate. This allows others to rely upon signatures or on assertions made about the private key that corresponds to the certified public key. CA 209 acts as a trusted third party—trusted both by the subject (owner) of the digital certificate and by the party relying upon the digital certificate.

To start the enrollment process, management module 110 in IT device 101 generates at least one pair of unique public and private hardware-based keys for that IT device 101 and stores the hardware-based key pair on the IT device 101. The hardware-based key pair is unique because it is created in the IT device 101 by processing a signature through a unique pathway in the IT device 101 that can only be replicated by the pathway in the IT device 101. The term "signature" may include, but is not limited to, a handwritten signature, symbol, number, or number sequence. The hardware-based key pair is created by combining (e.g., mixing or overlaying) the signature with a random number generated by a random number generator in the IT device 101. In some implementations, the hardware-based key pair is protected from physical intrusion on the IT device 101, by using one or more Tamper Resistant Mechanisms (TPMs), such as by storing the hardware-based key pair in a Tamper Resistant Device such as, but not limited to a SmartChip, Trusted Platform Module (TPM) or USB token, which may be incorporated into the IT device 101 or which may reside in another component. A hash of the public hardware-based key may be communicated to the enrollment API 202 where it may be stored.

Management module 110 on IT device 101 may generate a user interface screen to request user login information for the cloud-computing platform 145. The user interface screen may be displayed at, for example, IT device 101 or a device coupled to IT device 101. The user login information may be, but is not limited to, a username, password, personal identification number (PIN) number, or any combination thereof, for an organization or user registered on the cloud-computing platform 145. Management module 110 may then communicate an enrollment request 210 with the hash of the public hardware-based key and the user login information to enrollment API 202.

If the received user login information matches previously stored user login information (i.e., user authentication is successful), the enrollment API 202 stores the hash of the public hardware-based key and generates and stores a unique IT device identifier. The IT device identifier 211 may be used to uniquely identify the IT device 101, and may include a random string of characters (e.g., numeric, alphabetic), including, but not limited to, a Globally Unique Identifier (GUID), a Universally Unique Identifier (UUID), or a 45-character alphanumeric string. Enrollment API 202 sends the unique IT device identifier 211 to the management module 110 for storing on the IT device 101. The unique IT device identifier 211 and the hash of the public hardware-based key may be collectively referred to as the "authentication information" herein. Both the IT device 101 and enrollment API 202 may store the authentication information on, for example, the non-transitory computer-readable media.

In the next stage of the initialization process, a signed certificate is generated. The signed certificate may be used for mutual authentication, which will be described later. In some implementations, management module 110 in the IT device 101 generates a certificate signing request 212 using the authentication information stored on IT device 101, and sends the request 212 to pairing API 204. Pairing API 204 verifies the received authentication information to check if it matches the authentication information previously stored by enrollment API 202.

If both received and previously stored authentication information match, pairing API 204 sends a request 213 to the certificate authority (CA) 209 to sign the certificate signing request 212. CA 209 returns a signed certificate 214 associated with the public hardware-based key to pairing API 204. Pairing API 204 then communicates to the management module 110 the signed certificate 215 associated with its public hardware-based key. The signed certificate 215 may be stored on the IT device 101. The signed certificate 215 may expire or be invalidated after a period of time, and may need to be re-generated by sending another certificate signing request 212.

In the next stage of the initialization process, mutual authentication is established between IT device 101 and cloud-computing platform 145. Mutual authentication is a two-way authentication process in which both the IT device 101 and the cloud-computing platform 145 authenticate each other. Mutual authentication may be provided in accordance with a standard protocol, including, but not limited to, secure socket layer (SSL) and transport layer security (TLS), Internet Key Exchange (IKE) and Secure Shell (SSH).

To establish mutual authentication, management module 110 may send a request 217 to cloud broker 208 on the cloud-computing platform 145 to initiate communication. The signed certificate of the cloud-computing platform 218 may be transferred from cloud broker 208 to management module 110 of the IT device 101. Management module 110 may send a request 222 with the signed certificate to an external certificate authority 221 for verification. Once verified, external certificate authority 221 may send a response 223 to confirm the verification. Alternatively, for efficiency, the signed certificate may also be verified by a certificate authority (CA) broker 224 on the IT device 101, if the external certificate authority information has been previously stored in the CA broker 224. Once the signed certificate of the cloud-computing platform 218 is successfully verified, management module 110 may transfer the signed certificate 219 of the IT device 101 to cloud broker 208 on the cloud-computing platform 145. Cloud broker 208 may verify the signed certificate 219 of the IT device 101 with the certificate authority 209 on the cloud-computing platform 145.

In response to successful verification of the signed certificate 219, mutual authentication is thereby established and initialization information 220 is exchanged between IT device 101 and cloud-computing platform 145. Such initialization information 220 may include, but is not limited to, configuration file for remotely configuring IT device 101, automation scripts and configuration information of devices attached to IT device 101, firmware updates of the IT device 101 and/or devices attached thereto, any type of file (e.g., log data, configuration, software/firmware), telemetry information of IT device 101 and/or devices attached thereto (e.g., network statistics, network status), IT device uptime, IT device status, IT device configuration status, sensor information, power information, simple network management protocol (SNMP) information, events, alerts, remote access and/or control information (e.g., console access, serial access, web access, key-board-video access, mouse-key-board-screen access, power management), or a combination thereof.

Figure 3:
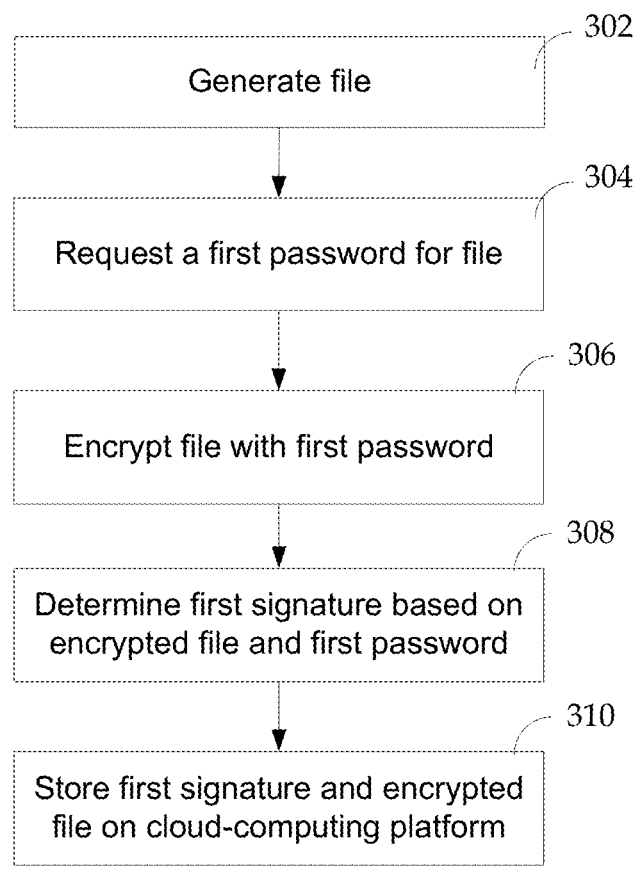
FIG. 3 illustrates an exemplary method of uploading an encrypted file to cloud-computing platform.

FIG. 3 illustrates an exemplary method 300 of uploading an encrypted file to cloud-computing platform 145. It should be understood that the steps of the method 300 may be performed in the order shown or a different order. Additional, different, or fewer steps may also be provided. Further, the method 300 may be implemented with the system 100 of FIG. 1, a different system, or a combination thereof.

At 302, security unit 142 on client device 140 generates a file. The file may be processed on IT device 101 by, for example, executing, loading and/or installing it. In some implementations, the file is a configuration file for IT device 101. The file may include, but is not limited to, an executable software file, a custom script file containing instructions to be executed, a backup file for restoring or persisting data on IT device 101, a set of command-line interface (CLI) commands, a data file, or a combination thereof. The file may also be an automation script with instructions in, for example, Python, JavaScript, shell script, binary language or a combination thereof. The file may be compressed to reduce storage requirements.

At 304, security unit 142 requests a first password for the file. The first password may be provided by a user via a user interface screen displayed at client device 140. The first password may be, for example, a string of characters used to confirm the identity of the user. The file is to be processed only on an IT device 101 that has the same password stored in its non-transitory computer-readable medium (e.g., flash memory). The password may have been previously stored during, for example, enrollment or initialization of the IT device 101. The IT device 101 may provide a secure way to store and retrieve this password from its memory whenever necessary, creating a secure link between the file and that specific password. Such password is not stored on the cloud-computing platform 145, thereby advantageously preventing unauthorized access of the password via the cloud-computing platform 145.

At 306, security unit 142 encrypts the file with the first password to generate an encrypted file. Exemplary encryption algorithms include, but are not limited to, Data Encryption Standard (DES), Triple DES, Rivest-Shamir-Adleman (RCA), Blowfish, Twofish, Advanced Encryption Standard (AES) 128-bit encryption, AES 192-bit encryption and AES 256-bit encryption. Other types of encryption algorithms are possible too.

At 308, a first signature is determined based on the encrypted file and the first password. In some implementations, security unit 142 on client device 140 determines the first signature and uploads the encrypted file and the first signature to the cloud-computing platform 145. Security unit 142 may determine the first signature by first calculating the checksum of the encrypted file. The checksum is a small-sized datum derived from the encrypted file for detecting errors which may have been introduced during its transmission or storage. The checksum may be used to verify data integrity. The checksum may be generated by a checksum algorithm or function.

Security unit 142 may then hash the checksum with the hash of the first password to generate a first signature. This hashed combination is the authenticated signature of the file that is stored with the encrypted file on the cloud-computing platform 145. From the authenticated signature, it is very unlikely to be possible to extract the original password and use it to authenticate the signature of another file, therefore making it very difficult to generate a valid authenticated signature for another file. Since the password is not stored on the cloud-computing platform 145, it is advantageously not possible to tamper with a file and recreate its authenticated signature, which is required to be validated on the IT device 101 before the file may be processed.

In other implementations, the cloud-computing platform 145 determines the first signature. In one example, security unit 142 on the client device 140 determines a hash of the first password. Security unit 142 may then upload the encrypted file and the hash of the first password to the cloud-computing platform 145. Cloud-computing platform 145 may then determine a first checksum of the encrypted file. To generate the first signature, cloud-computing platform 145 may hash the first checksum with the hash of the first password to generate the first signature.

In another example, security unit 142 on the client device 140 uploads the encrypted file to the cloud-computing platform 145. Cloud-computing platform 145 determines a first checksum of the encrypted file. To generate the first signature, cloud-computing platform 145 then hashes the first checksum with a hash of a second password. Cloud-computing platform 145 may request the second password from the user via, for example, a user interface screen displayed at client device 140. The second password is not stored on the cloud-computing platform 145. Cloud-computing platform 145 may then calculate the hash of the second password. For successful validation of the authenticity of the encrypted file, the second password should be the same as the first password used to encrypt the file on client device 140.

At 310, the first signature and encrypted file are stored on the cloud-computing platform 145. The cloud-computing platform 145 stores the encrypted file and the first signature for downloading to the IT device 101. The first signature may be used by the IT device 101 to validate the authenticity of the encrypted file.

Figure 4:
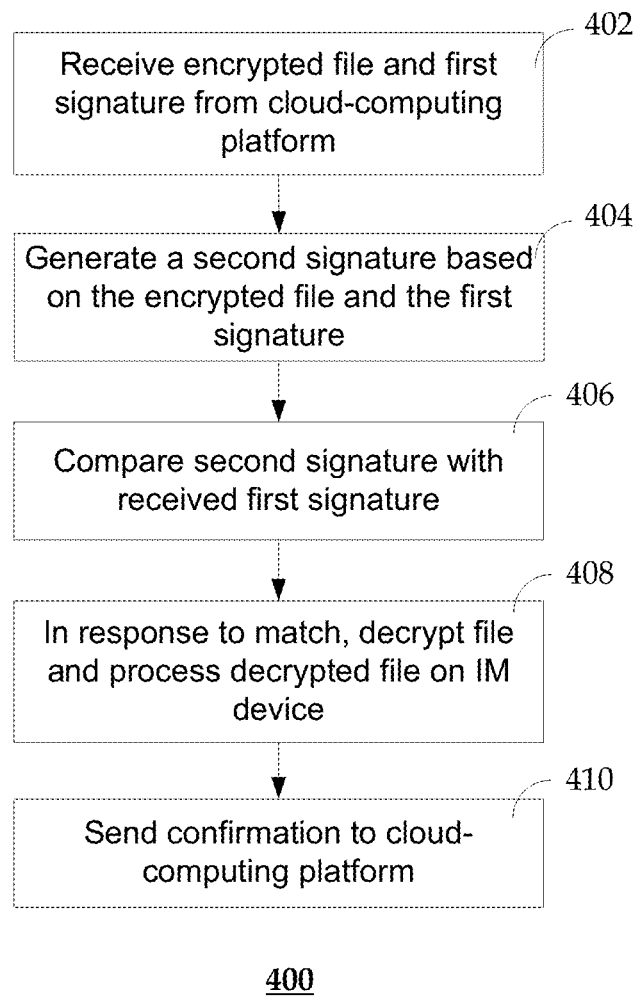
FIG. 4 illustrates an exemplary method of processing an encrypted file on an IT device.

FIG. 4 illustrates an exemplary method 400 of processing an encrypted file on IT device 101. It should be understood that the steps of the method 400 may be performed in the order shown or a different order. Additional, different, or fewer steps may also be provided. Further, the method 400 may be implemented with the system 100 of FIG. 1, a different system, or a combination thereof.

At 402, security module 112 in IT device 101 receives the encrypted file and first signature from the cloud-computing platform 145. The encrypted file and first signature may be sent by the cloud-computing platform 145 in response to a request from security unit 142 in client device 140 to process the encrypted file on IT device 101.

At 404, security module 112 generates a second signature based on the encrypted file and the first signature. In some implementations, the second signature is generated by first calculating the checksum of the received encrypted file. The checksum may be determined using the same checksum algorithm or function used by security unit 142 in the client device 140 at step 308 in FIG. 3. Security module 112 may then retrieve the password from a non-transitory computer-readable medium (e.g., flash memory) in the IT device 101. The password may have been previously stored in the IT device 101 during, for example, initialization. For successful validation of the authenticity of the encrypted file, the retrieved password should be the same as the first password used to encrypt the file on client device 140. Security module 112 may then calculate the hash of the retrieved password. The second signature may be generated by hashing the checksum with the hash of the password.

At 406, security module 112 compares the second signature with the received first signature to validate authenticity of the encrypted file. If the first and second signatures match, file authentication is determined to be successful.

At 408, in response to determining the first and second signatures match, security module 112 decrypts the file with the password. The decrypted file may then be processed on the IT device 101.

At 410, security module 112 may send a confirmation message to the cloud-computing platform 145 in response to successful processing of the file on IT device 101. In response to receiving the confirmation message, cloud-computing platform 145 may send a message to security unit 142 in client device 140 to confirm that the file is successfully processed.

Figure 5:
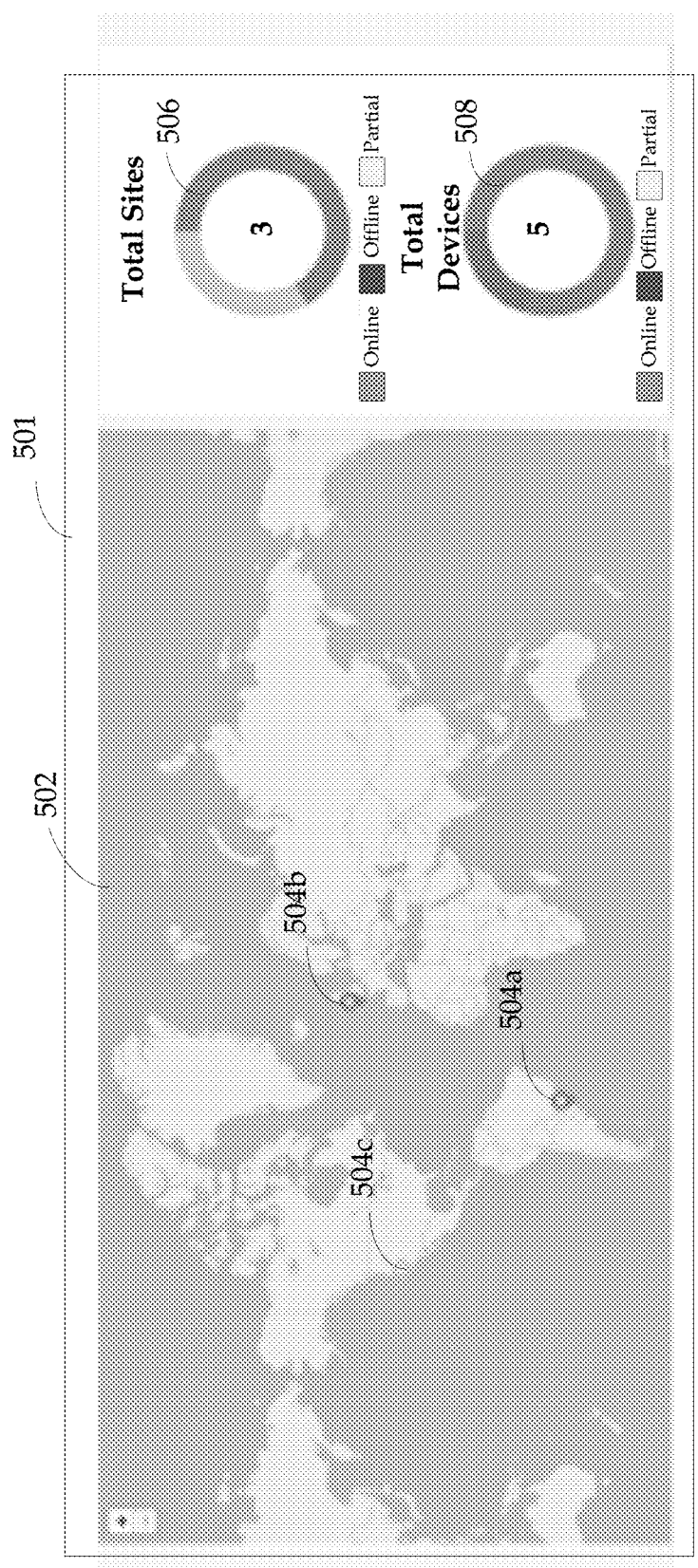
FIG. 5 shows an exemplary user interface screen displayed at client device.

FIG. 5 shows an exemplary user interface screen 501 displayed at client device 140. User interface screen 501 may be generated by management system 148 of the cloud-computing platform 145 to manage and monitor IT device 101. User interface screen 501 may be displayed by, for example, an App or other types of software installed on client device 140 to facilitate communication between client device 140 and cloud-computing platform 145.

In some implementations, user interface screen 501 is displayed after user authentication is performed. For example, a user may register and log into the cloud-computing platform 145 by providing a valid username and password. User interface screen 501 shows a geographic map 502 (or other graphical representation) with one or more markers 504a-c. The markers 504a-c may indicate the locations of IT devices and/or sites registered for the user (or the user's organization). Each marker 504a-c may be color-coded (e.g., red, green, blue) or otherwise visually differentiated to represent the status of each site or IT device. Each site may represent a branch office or headquarters of an organization. One or more IT devices may be located at each site.

A first pie chart 506 may be displayed to indicate the proportion of each status and the total number of sites. Other types of graphical representations are also useful. The statuses may be color coded (e.g., red, green, blue) or otherwise visually differentiated. The status of each site may be online, offline or partial. A site may be "online" if all IT devices installed on that site are currently in communication with the cloud-computing platform 145 (i.e., online). A site may be "offline" if all IT devices installed on that site are currently not in communication with the cloud-computing platform 145 (i.e., offline). A site may be "partial" if one or more IT devices installed on that site are online and one or more IT devices installed on that site are offline.

A second pie chart 508 may be displayed to indicate the proportion of each status and the total number of IT devices. Other types of graphical representations are also useful. The statuses may be color coded (e.g., red, green, blue) or otherwise visually differentiated. The status of each IT device may be online, offline or never connected. An IT device may be "online" if it is currently in communication with the cloud-computing platform 145. An IT device may be "offline" if it is currently not in communication with the cloud-computing platform 145. An IT device may be "never connected" if it has never communicated with cloud-computing platform 145.

Additional user interface screens may be generated to enroll, configure, monitor and manage enrolled IT devices. For example, a table of enrolled IT devices may be displayed. The table may show information regarding each IT device, such as, but not limited to, model, processor identifier, part number, current software information (e.g., version, uptime, revision tag), times when the IT device was first and last connected to the cloud-computing platform 145, or a combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded systems, machines a combination thereof, and/or the like. The processing hardware may be configured to execute instructions. The instructions may be stored on one or more computer-readable or machine-readable media. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, a combination thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

What is claimed is:

1. An information technology (IT) device, comprising:
one or more non-transitory computer-readable media for storing computer-readable program code and a password; and
a processor in communication with the one or more non-transitory computer-readable media, the processor being operative with the computer-readable program code to perform operations including
receiving an encrypted file and a first signature from a cloud-computing platform,
determining a checksum of the encrypted file,
determining a hash of the password retrieved from the one or more non-transitory computer-readable media,
generating a second signature by hashing the checksum with the hash of the password,
in response to determining a match between the first and second signatures, decrypting the encrypted file with the password to generate a decrypted file, and
processing the decrypted file.

2. A method for cloud-based communication, comprising:
generating, by a client device, a file for an information technology (IT) device, wherein the IT device stores a first password;
requesting, by the client device, the first password for the file from a user;
encrypting, by the client device, the file with the first password to generate an encrypted file;
determining a first signature based on the encrypted file and the first password; and
storing the first signature and the encrypted file on a cloud-computing platform for downloading by the IT device, wherein the first signature is used by the IT device to validate authenticity of the encrypted file.

3. The method of claim 2 wherein determining the first signature comprises:
determining, by the client device, a first checksum of the encrypted file;

generating, by the client device, the first signature by hashing the first checksum with a hash of the first password; and uploading, by the client device, the encrypted file and the first signature to the cloud-computing platform.

4. The method of claim 2 wherein determining the first signature comprises:
determining, by the client device, a hash of the first password;
uploading, by the client device, the encrypted file and the hash of the first password to the cloud-computing platform;
determining, by the cloud-computing platform, a first checksum of the encrypted file; and
hashing, by the cloud-computing platform, the first checksum with the hash of the first password to generate the first signature.

5. The method of claim 2 wherein determining the first signature comprises:
uploading, by the client device, the encrypted file to the cloud-computing platform;
determining, by the cloud-computing platform, a first checksum of the encrypted file; and
hashing, by the cloud-computing platform, the first checksum with a hash of a second password to generate the first signature.

6. The method of claim 5 further comprises requesting, by the cloud-computing platform, the second password.

7. The method of claim 5 further comprises determining, by the cloud-computing platform, the hash of the second password.

8. The method of claim 2 wherein generating the file comprises generating an executable software file, a custom script file, a backup file for restoring or persisting data on the IT device, a set of command-line interface (CLI) commands, a data file, an automation script, or a combination thereof.

9. The method of claim 2 further comprises:
receiving, by the IT device, the encrypted file and the first signature;
generating, by the IT device, a second signature based on the encrypted file and a third password; and
validating, by the IT device, authenticity of the encrypted file by comparing the first and second signatures.

10. The method of claim 9 further comprises:
in response to determining the first and second signatures match, decrypting the encrypted file with the third password to generate a decrypted file; and
processing the decrypted file on the IT device.

11. The method of claim 10 further comprises:
sending, by the IT device, a confirmation message to the cloud-computing platform in response to successful processing of the decrypted file on the IT device.

12. The method of claim 9 wherein generating the second signature comprises:
calculating, by the IT device, a second checksum of the encrypted file;
retrieving, by the IT device, the third password stored on the IT device;
calculating a hash of the third password; and
generating the second signature by hashing the second checksum with the hash of the third password.

13. The method of claim 2 further comprises enrolling the IT device with the cloud-computing platform.

14. The method of claim 13 wherein the enrolling the IT device comprises:
generating a public hardware-based key and private hardware-based key for the IT device;
communicating an enrollment request to the cloud-computing platform, wherein the enrollment request includes a hash of the public hardware-based key and user login information;
performing user authentication based on the user login information;
in response to successful user authentication, generating a unique IT device identifier and storing the unique IT device identifier and the hash of the public hardware-based key on the cloud-computing platform; and
sending the unique IT device identifier to the IT device and storing the unique IT device identifier on the IT device.

15. The method of claim 14 further comprises generating a signed certificate.

16. The method of claim 15 wherein generating the signed certificate comprises:
retrieving authentication information stored on the IT device;
communicating a certificate signing request with the IT device unique identifier and the hash of the public hardware-based key to the cloud-computing platform; and
in response to a match between the authentication information received by the cloud-computing platform and the authentication information stored on the cloud-computing platform, communicating the signed certificate from the cloud-computing platform to the IT device.

17. The method of claim 16 wherein the authentication information comprises a unique IT device identifier of the IT device and a hash of a public hardware-based key.

18. The method of claim 15 further comprises establishing mutual authentication using the signed certificate.

19. One or more non-transitory computer-readable media embodying a program of instructions executable by machine to perform steps, the steps comprising:
generating a public hardware-based key and private hardware-based key for an IT device;
communicating an enrollment request to a cloud-computing platform, wherein the enrollment request includes a hash of the public hardware-based key and user login information;
performing user authentication based on the user login information;
in response to successful user authentication, generating a unique IT device identifier and storing the unique IT device identifier and the hash of the public hardware-based key on the cloud-computing platform; and
sending the unique IT device identifier to the IT device and storing the unique IT device identifier on the IT device.

20. The one or more non-transitory computer-readable media of claim 19 wherein the steps further comprise generating a signed certificate for mutual authentication.

* * * * *